(12) United States Patent
Fung et al.

(10) Patent No.: US 9,313,343 B2
(45) Date of Patent: Apr. 12, 2016

(54) METHODS AND SYSTEMS FOR COMMUNICATING SENSOR DATA ON A MOBILE DEVICE

(71) Applicant: Google Inc., Mountain View, CA (US)

(72) Inventors: James Fung, Mountain View, CA (US);
Joel Hesch, Mountain View, CA (US);
Johnny Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 61 days.

(21) Appl. No.: 14/185,091

(22) Filed: Feb. 20, 2014

(65) Prior Publication Data
US 2015/0237223 A1  Aug. 20, 2015

(51) Int. Cl.
| | | |
|---|---|---|
| *H04N 5/77* | (2006.01) | |
| *H04N 5/232* | (2006.01) | |
| *H04N 1/00* | (2006.01) | |
| *H04N 5/225* | (2006.01) | |

(52) U.S. Cl.
CPC .......... *H04N 1/00204* (2013.01); *H04N 5/2257* (2013.01); *H04N 5/232* (2013.01); *H04N 5/772* (2013.01); *H04N 2201/0084* (2013.01)

(58) Field of Classification Search
CPC . H04N 1/00204; H04N 5/2257; H04N 5/772; H04N 2201/0084
See application file for complete search history.

(56) References Cited

U.S. PATENT DOCUMENTS

| | | | |
|---|---|---|---|
| 5,737,491 A | 4/1998 | Allen et al. | |
| 6,104,430 A | 8/2000 | Fukuoka | |
| 2009/0174783 A1* | 7/2009 | Nomura et al. | 348/208.2 |
| 2011/0069229 A1 | 3/2011 | Lord | |
| 2011/0234825 A1* | 9/2011 | Liu et al. | 348/208.5 |
| 2013/0215295 A1 | 8/2013 | Baek et al. | |
| 2013/0222426 A1 | 8/2013 | Hymel | |
| 2015/0163414 A1* | 6/2015 | Nikkanen | H04N 5/353 348/229.1 |
| 2015/0189190 A1* | 7/2015 | Fung | H04N 5/262 348/222.1 |
| 2015/0233743 A1* | 8/2015 | Fung | G01D 21/02 702/187 |
| 2015/0235335 A1* | 8/2015 | Fung | G06T 1/0021 455/556.1 |

FOREIGN PATENT DOCUMENTS

| | | |
|---|---|---|
| JP | 2004-120611 | 4/2004 |
| KR | 10-2005-0058886 | 6/2005 |

OTHER PUBLICATIONS

International Search Report and Written Opinion from corresponding International Application No. PCT/US2014/072510, mailed Mar. 24, 2015, 14 pages.
Non-Final Office Action mailed Jul. 17, 2015 for U.S. Appl. No. 14/145,522, 19 pages.

* cited by examiner

*Primary Examiner* — Mekonnen Dagnew

(57) ABSTRACT

Methods and systems for communicating sensor data on a mobile device are described. An example method involves receiving, by a processor and from an inertial measurement unit (IMU), sensor data corresponding to a first timeframe, and storing the sensor data using a data buffer. The processor may also receive image data and sensor data corresponding to a second timeframe. The processor may then generate a digital image that includes at least the image data corresponding to the second timeframe and the sensor data corresponding to the first timeframe and the second timeframe. The processor may embed the stored sensor data corresponding to the first timeframe and the second timeframe in pixels of the digital image. And the processor may provide the digital image to an application processor of the mobile device.

20 Claims, 10 Drawing Sheets

700

| LINE / ROW | |
|---|---|
| 0 - 15 | SENSOR DATA |
| 16 - 30 | COMPUTER-VISION DATA |
| 31 - 510 | FIRST (WIDE-ANGLE) CAMERA DATA<br>640 x 480 |
| 511-690 | DEPTH DATA<br>320 x 180 |
| 691 - 1170 | SECOND CAMERA DATA<br>640 x 480 |

METHODS AND SYSTEMS FOR COMMUNICATING SENSOR DATA ON A MOBILE DEVICE

BACKGROUND

In addition to having advanced computing and connectivity capabilities to facilitate high-speed data communication, many modern mobile devices include a variety of sensors. For example, mobile devices, such as smartphones, tablets, and wearable computing devices, are often equipped with sensors for imaging and positioning. A few examples of sensors that may be found in a mobile device include accelerometers, gyroscopes, magnetometers, barometers, global positioning system (GPS) receivers, microphones, cameras, Wi-Fi sensors, Bluetooth sensors, temperature sensors, and pressure sensors, among other types of sensors.

The wide variety of available sensors enables mobile devices to perform various functions and provide various user experiences. As one example, a mobile device may use imaging and/or positioning data to determine a trajectory of the mobile device as a user moves the mobile device through an environment. As another example, a mobile device may use imaging and/or positioning data to generate a 2D or 3D map of an environment, or determine a location of a mobile device within a 2D or 3D map of an environment. As a further example, a mobile device may use imaging and/or positioning data to facilitate augmented reality applications. Other examples also exist.

SUMMARY

Within examples, a co-processor of a mobile device may be configured to provide data from two or more sensors to an application processor within a single data structure. For instance, the co-processor may be configured to generate a digital image for a current timeframe that includes image data acquired using a camera of the mobile device as well as sensor data from another sensor of the mobile device. Moreover, multiple digital images can be provided in sequence, as new image data and sensor data is acquired by the mobile device during subsequent timeframes.

Disclosed herein are methods and systems for redundantly communicating sensor data to an application processor within a digital image. As described below, a processor may be configured to generate a digital image for a current timeframe that includes sensor data from one or more previous timeframes. By way of example, the processor may receive new sensor data during a first timeframe, and include the sensor data within a first digital image. Further, the processor may receive new sensor data during a second timeframe. In a second digital image corresponding to the second timeframe, the processor may include the sensor data corresponding to the second timeframe as well as the sensor data corresponding to the first timeframe. In some instances, the sensor data from one or more previous timeframes can be used by an application processor to perform a function on the mobile device (e.g., an odometry or mapping function) in the event that a current digital image includes invalid or corrupt data.

In one example aspect, a method is provided. The method involves receiving, by a processor of a mobile device and from an inertial measurement unit (IMU) of the mobile device, sensor data corresponding to a first timeframe. The method also involves storing, by the processor, the sensor data corresponding to the first timeframe using a data buffer. The method further involves receiving, by the processor and from at least one camera of the mobile device, image data corresponding to a second timeframe. The second timeframe may be subsequent to the first timeframe. The method also involves receiving, by the processor and from the IMU, sensor data corresponding to the second timeframe. The method then involves generating, by the processor, a digital image that includes at least the image data corresponding to the second timeframe, the stored sensor data corresponding to the first timeframe, and the sensor data corresponding to the second timeframe. The stored sensor data corresponding to the first timeframe and the second timeframe may be embedded in pixels of the digital image. And the method involves providing, by the processor, the digital image to an application processor of the mobile device.

In another example aspect, a processing unit in a mobile device is provided. The processing unit includes a data storage and instructions stored in the data storage and executable by the processing unit to perform functions. The functions include receiving from an IMU of the mobile device sensor data corresponding to a first timeframe, and receiving from at least one camera of the mobile device image data corresponding to the first timeframe. The functions also include accessing stored sensor data corresponding to a second timeframe that precedes the first timeframe. The functions further include generating a digital image that includes at least the image data corresponding to the first timeframe, the stored sensor data corresponding to the second timeframe, and the sensor data corresponding to the first timeframe. The stored sensor data corresponding to the second timeframe and the sensor data corresponding to the first timeframe may be embedded in pixels of the digital image. And the functions include providing the digital image to an application processor of the mobile device.

In still another example aspect, a mobile device is provided. The mobile device includes at least one camera, an IMU, a first data buffer, a second data buffer, a processor, and an application processor. The processor is configured to receive from the IMU sensor data corresponding to a first timeframe, and receive from the at least one camera image data corresponding to the first timeframe. The processor is also configured to access from the first data buffer stored sensor data corresponding to a second timeframe that precedes the first timeframe. And the processor is configured to generate a digital image that includes at least the image data corresponding to the first timeframe, the stored sensor data corresponding to the second timeframe, and the sensor data corresponding to the first timeframe. The stored sensor data corresponding to the second timeframe and the sensor data corresponding to the first timeframe may be embedded in pixels of the digital image. The application processor is configured to receive the digital image from the processor, and store the image data corresponding to the first timeframe and the sensor data corresponding to the first timeframe in the second data buffer.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 7 is a conceptual illustration of an example digital image format.

DETAILED DESCRIPTION

Figure 1:
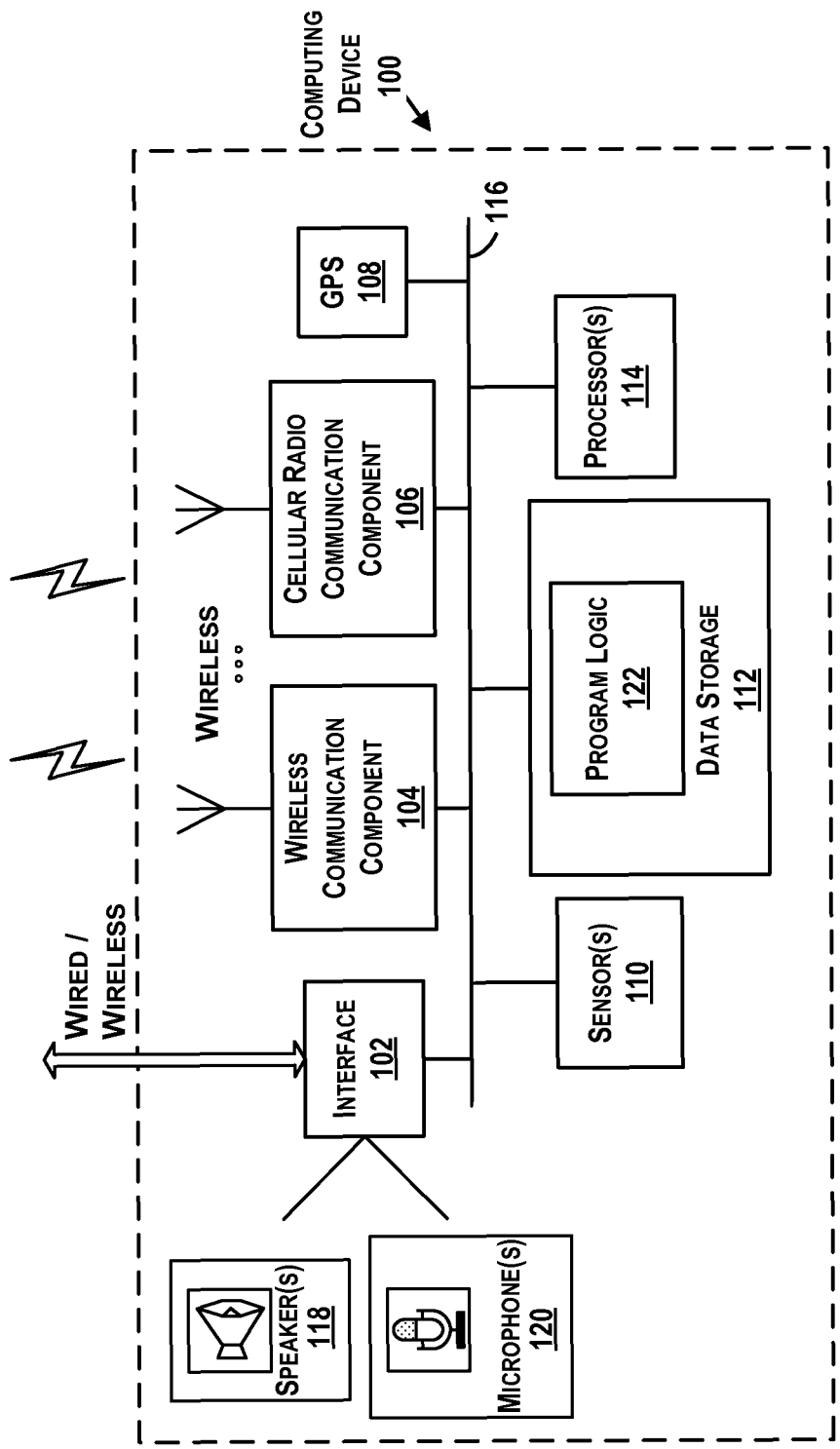
FIG. 1 illustrates an example computing device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In examples in which a mobile device relies on data from two or more sensors to perform a particular function (e.g., trajectory determination, map generation, etc.), it can be beneficial to provide data from each of the sensors to an application processor within a single data structure. Providing data from each of the sensors within a single data structure may help ensure that data from each of the sensors corresponds to data collected during the same instance in time or a same time period.

If the data from one or more of the sensors is an image, one solution is to generate a digital image that includes both the image and the sensor data from another sensor. For instance, a co-processor of the mobile device may be configured to embed the sensor data within one or more pixels of the digital image. The digital image can then be provided to the application processor using a camera bus interface. Furthermore, if image data and sensor data are repeatedly acquired, multiple digital images that include new image data and sensor data can be generated and provided in sequence to the application processor.

Furthermore, when multiple digital images are being generated by the co-processor and provided to the application processor at a high frame rate, there is a possibility that a digital image may be dropped (i.e., not received by an application processor) if the co-processor is overloaded or otherwise unable to correctly generate and/or transmit the digital image to the application processor in a timely manner. This may negatively affect the ability of the application processor to perform one or more functions, such as trajectory determination, map generation, etc., because data from a timeframe corresponding to the dropped digital image is unavailable.

Disclosed herein are methods and systems to improve some of these processes. According to an example method, instead of just providing the latest sensor data corresponding to a current timeframe within a digital image, a processor may be configured to generate a digital image that also includes sensor data from one or more previous timeframes. For instance, the processor may receive new sensor data during a first timeframe, and include the sensor data within a first digital image. Further, the processor may receive new sensor data during a second timeframe. In a second digital image corresponding to the second timeframe, the processor may then include the sensor data corresponding to the second timeframe as well as the sensor data corresponding to the first timeframe. In the event that the first digital image is not received by the application processor, the application processor may use the sensor data corresponding to the first timeframe that is included within the second digital image to make up for the sensor data that was not received within the first digital image.

In some embodiments, the sensor data may be data received from an IMU of the mobile device. Depending on the frequency with which the IMU is configured to output data, the sensor data corresponding to a current timeframe image may include multiple outputs corresponding to respective sub-frames within the timeframe. For example, if digital images are being generated at 30 Hz and IMU data is being output at 100 or 120 Hz, the sensor data for the current timeframe may include multiple intervals of sensor data. Additionally, the processor of the mobile device that generates the digital images may be configured to store sensor data corresponding to one or more previous timeframes within a data buffer. And the processor may then include the stored sensor data corresponding to the one or more previous timeframes within each new digital image generated by the processor.

In some embodiments, the processor may also send one or more types of sensor data to the application processor using a separate channel from the camera bus interface used for providing the digital image to the application processor. Alternatively, the one or more sensors may output data directly to the application processor using a low-latency side-channel. For instance, the processor may send IMU data to the application processor on a low-latency side-channel, or the IMU may output data directly to the application processor. The IMU data might also be included in the digital image, but the application processor may receive the IMU data via the low-latency side-channel before the application processor receives the digital image. This may enable the application processor to access IMU data quicker, in order to perform one or more time-sensitive functions. In some instances, the IMU data sent to the application processor using the low-latency side-channel may also include timestamps determined by the processor.

In some embodiments, the processor may also be configured to generate computer-vision data using images received from a camera of the mobile device. The computer-vision data may identify locations and/or descriptions of image features determined using a two-dimensional image and/or image features determined using depth data. Example types of image features include edges, corners/interest points, and blobs. The processor may also be configured to store computer-vision data corresponding to one or more previous timeframes within a data buffer. And the processor may then include the stored computer-vision data within each new digital image generated by the processor.

Additional example methods as well as example devices (e.g., mobile or otherwise) are described hereinafter with reference to the accompanying figures.

Referring now to the figures, FIG. 1 illustrates an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, email/messaging device, tablet computer, or similar device that may be configured to perform the functions described herein. Generally, the computing device 100 may be any type of computing device or transmitter that is configured to transmit data or receive data in accordance with methods and functions described herein.

The computing device 100 may include an interface 102, a wireless communication component 104, a cellular radio communication component 106, a global positioning system (GPS) receiver 108, sensor(s) 110, data storage 112, and processor(s) 114. Components illustrated in FIG. 1 may be linked together by a communication link 116. The computing device 100 may also include hardware to enable communication within the computing device 100 and between the computing device 100 and other computing devices (not shown), such as a server entity. The hardware may include transmitters, receivers, and antennas, for example.

The interface 102 may be configured to allow the computing device 100 to communicate with other computing devices (not shown), such as a server. Thus, the interface 102 may be configured to receive input data from one or more computing devices, and may also be configured to send output data to the one or more computing devices. The interface 102 may be configured to function according to a wired or wireless communication protocol. In some examples, the interface 102 may include buttons, a keyboard, a touchscreen, speaker(s) 118, microphone(s) 120, and/or any other elements for receiving inputs, as well as one or more displays, and/or any other elements for communicating outputs.

The wireless communication component 104 may be a communication interface that is configured to facilitate wireless data communication for the computing device 100 according to one or more wireless communication standards. For example, the wireless communication component 104 may include a Wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may be a communication interface that is configured to facilitate wireless communication (voice and/or data) with a cellular wireless base station to provide mobile connectivity to a network. The cellular radio communication component 106 may be configured to connect to a base station of a cell in which the computing device 100 is located, for example.

The GPS receiver 108 may be configured to estimate a location of the computing device 100 by precisely timing signals sent by GPS satellites.

The sensor(s) 110 may include one or more sensors, or may represent one or more sensors included within the computing device 100. Example sensors include an accelerometer, gyroscope, pedometer, light sensor, microphone, camera(s), infrared flash, barometer, magnetometer, Wi-Fi, near field communication (NFC), Bluetooth, projector, depth sensor, temperature sensor, or other location and/or context-aware sensors.

The data storage 112 may store program logic 122 that can be accessed and executed by the processor(s) 114. The data storage 112 may also store data collected by the sensor(s) 110, or data collected by any of the wireless communication component 104, the cellular radio communication component 106, and the GPS receiver 108.

The processor(s) 114 may be configured to receive data collected by any of sensor(s) 110 and perform any number of functions based on the data. As an example, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100. In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving, or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing g device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 100 may include more or fewer components. Further, example methods described herein may be performed individually by components of the computing device 100, or in combination by one or all of the components of the computing device 100.

Figure 2:
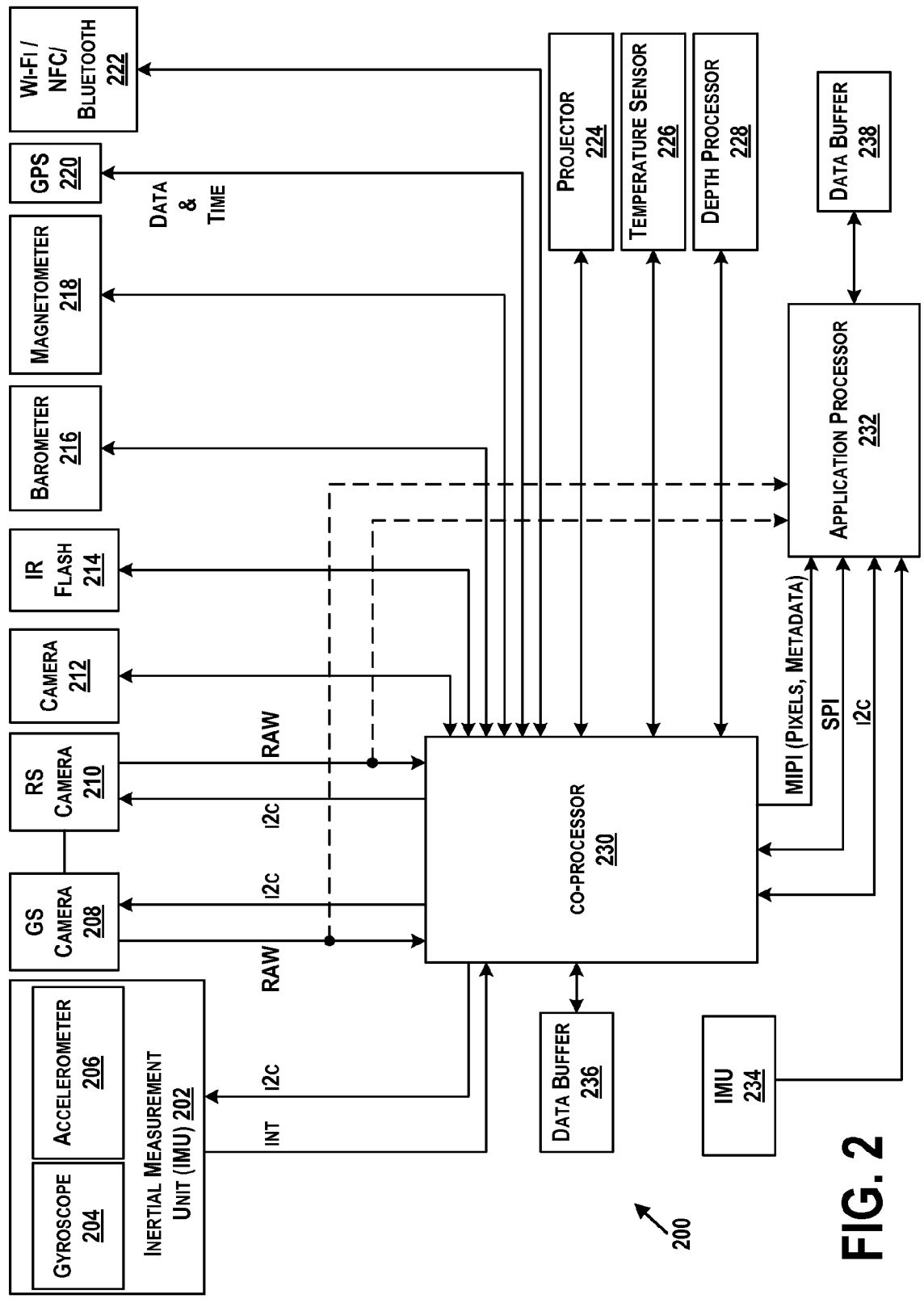
FIG. 2 illustrates another example computing device.

FIG. 2 illustrates another example computing device 200. The computing device 200 in FIG. 2 may be representative of a portion of the computing device 100 shown in FIG. 1. In FIG. 2, the computing device 200 is shown to include a number of sensors such as an inertial measurement unit (IMU) 202 including a gyroscope 204 and an accelerometer 206, a global shutter (GS) camera 208, a rolling shutter (RS) camera 210, a front facing camera 212, an infrared (IR) flash 214, a barometer 216, a magnetometer 218, a GPS receiver 220, a Wi-Fi/NFC/Bluetooth sensor 222, a projector 224, and a temperature sensor 226, each of which outputs to a co-processor 230. Additionally, the computing device 200 is shown to include a depth processor 228 that receives input from and outputs to the co-processor 230. And the co-processor 230 receives input from and outputs to an application processor 232.

The computing device 200 further includes a second IMU 234 that outputs directly to the application processor 232, a data buffer 236, and a data buffer 238.

The IMU 202 may be configured to determine one or any combination of a velocity, orientation, and acceleration of the computing device 200 based on outputs of the gyroscope 204 and the accelerometer 206.

The GS camera 208 may be configured on the computing device 200 to be a rear facing camera, so as to face away from a front of the computing device 200. The GS camera 208 may be configured to read outputs of all pixels of the camera 208 simultaneously. The GS camera 208 may be configured to have about a 120-170 degree field of view, such as a fish eye sensor, for wide-angle viewing.

The RS camera 210 may be configured to read outputs of pixels from a top of the pixel display to a bottom of the pixel display. As one example, the RS camera 210 may be a red/green/blue (RGB) infrared (IR) 4 megapixel image sensor, although other sensors are possible as well. The RS camera 210 may have a fast exposure so as to operate with a minimum readout time of about 5.5 ms, for example. Like the GS camera 208, the RS camera 210 may be a rear facing camera.

The camera 212 may be an additional camera in the computing device 200 that is configured as a front facing camera, or in a direction facing opposite of the GS camera 208 and the RS camera 210. The camera 212 may be a wide angle camera, and may have about a 120-170 degree field of view for wide angle viewing, for example.

The IR flash 214 may provide a light source for the computing device 200, and may be configured to output light in a direction toward a rear of the computing device 200 so as to provide light for the GS camera 208 and RS camera 210, for example. In some examples, the IR flash 214 may be configured to flash at a low duty cycle, such as 5 Hz, or in a non-continuous manner as directed by the co-processor 230 or application processor 232. The IR flash 214 may include an LED light source configured for use in mobile devices, for example.

Figure 3A:
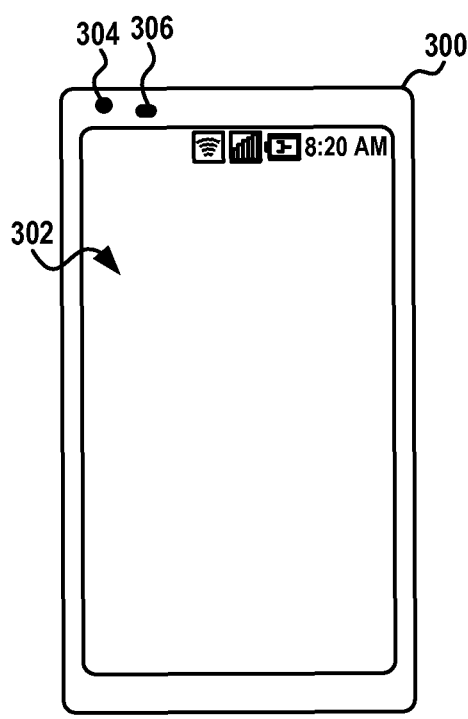
FIGS. 3A-3B are conceptual illustrations of an example computing device.
Figure 3B:
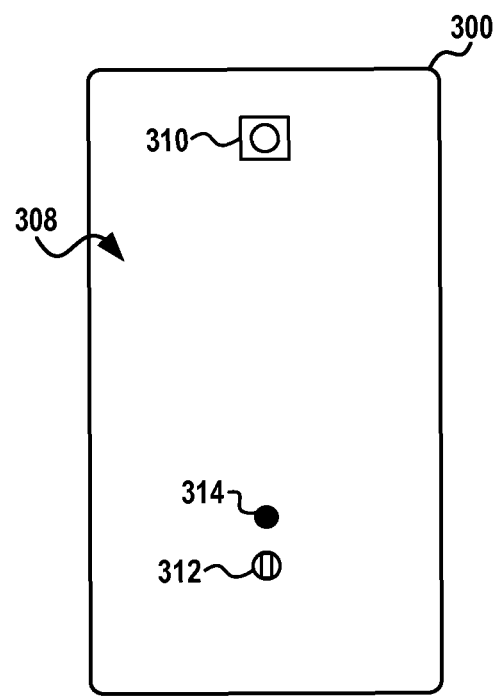

FIGS. 3A-3B are conceptual illustrations of a computing device 300 that show a configuration of some of the sensors on the computing device 300. In FIGS. 3A-3B, the computing device 300 is shown as a mobile phone. The computing device 300 may be similar to either of computing device 100 in FIG. 1 or computing device 200 in FIG. 2. FIG. 3A illustrates a front of the computing device 300 in which a display 302 is provided, along with a front facing camera 304, and a P/L sensor opening 306 (e.g., a proximity or light sensor). The front facing camera 304 may be the camera 212 as described in FIG. 2.

FIG. 3B illustrates a back 308 of the computing device 300 in which a rear camera 310 and another rear camera 314 are provided. The rear camera 310 may be the RS camera 210 and the rear camera 312 may be the GS camera 208, as described in the computing device 200 in FIG. 2. The back 308 of the computing device 300 also includes an IR flash 314, which may be the IR flash 214 or the projector 224 as described in the computing device 200 in FIG. 2. In one example, the IR flash 214 and the projector 224 may be one in the same. For instance, a single IR flash may be used to perform the functions of the IR flash 214 and the projector 224. In another example, the computing device 300 may include a second flash (e.g., an LED flash) located near the rear camera 310 (not shown). A configuration and placement of the sensors may be helpful to provide desired functionality of the computing device 300, for example, however other configurations are possible as well.

Referring back to FIG. 2, the barometer 216 may include a pressure sensor, and may be configured to determine air pressures and altitude changes.

The magnetometer 218 may be configured to provide roll, yaw, and pitch measurements of the computing device 200, and can be configured to operate as an internal compass, for example. In some examples, the magnetometer 218 may be a component of the IMU 202 (not shown).

The GPS receiver 220 may be similar to the GPS receiver 108 described in the computing device 100 of FIG. 1. In further examples, the GPS 220 may also output timing signals as received from GPS satellites or other network entities. Such timing signals may be used to synchronize collected data from sensors across multiple devices that include the same satellite timestamps.

The Wi-Fi/NFC/Bluetooth sensor 222 may include wireless communication components configured to operate according to Wi-Fi and Bluetooth standards, as discussed above with the computing device 100 of FIG. 1, and according to NFC standards to establish wireless communication with another device via contact or coming into close proximity with the other device.

The projector 224 may be or include a structured light projector that has a laser with a pattern generator to produce a dot pattern in an environment. The projector 224 may be configured to operate in conjunction with the RS camera 210 to recover information regarding depth of objects in the environment, such as three-dimensional (3D) characteristics of the objects. For example, the RS camera 210 may be an RGB-IR camera that is configured to capture one or more images of the dot pattern and provide image data to the depth processor 228. The depth processor 228 may then be configured to determine distances to and shapes of objects based on the projected dot pattern. By way of example, the depth processor 228 may be configured to cause the projector 224 to produce a dot pattern and cause the RS camera 210 to capture an image of the dot pattern. The depth processor may then process the image of the dot pattern, use various algorithms to triangulate and extract 3D data, and output a depth image to the co-processor 230.

The temperature sensor 226 may be configured to measure a temperature or temperature gradient, such as a change in temperature, for example, of an ambient environment of the computing device 200.

The co-processor 230 may be configured to control all sensors on the computing device 200. In examples, the co-processor 230 may control exposure times of any of cameras 208, 210, and 212 to match the IR flash 214, control the projector 224 pulse sync, duration, and intensity, and in general, control data capture or collection times of the sensors. The co-processor 230 may also be configured to process data from any of the sensors into an appropriate format for the application processor 232. In some examples, the co-processor 230 merges all data from any of the sensors that corresponds to a same timestamp or data collection time (or time period) into a single data structure to be provided to the application processor 232. The co-processor 230 may also be configured to perform other functions, as described below.

The application processor 232 may be configured to control other functionality of the computing device 200, such as to control the computing device 200 to operate according to an operating system or any number of software applications stored on the computing device 200. The application processor 232 may use the data collected by the sensors and received from the co-processor to perform any number of types of functionality. The application processor 232 may receive outputs of the co-processor 230, and in some examples, the application processor 232 may receive raw data outputs from other sensors as well, including the GS camera 208 and the RS camera 210. The application processor 232 may also be configured to perform other functions, as described below.

The second IMU 234 may output collected data directly to the application processor 232, which may be received by the application processor 232 and used to trigger other sensors to begin collecting data. As an example, outputs of the second IMU 234 may be indicative of motion of the computing device 200, and when the computing device 200 is in motion, it may be desired to collect image data, GPS data, etc. Thus, the application processor 232 can trigger other sensors through communication signaling on common buses to collect data at the times at which the outputs of the IMU 234 indicate motion.

Within examples, the co-processor 230 may be configured to store outputs from any of the sensors or information derived from outputs from any of the sensors using the data buffer 236. Similarly, the application processor 232 may be configured to store data received from the co-processor 230, such as a digital image or data within the digital image, using the data buffer 238.

The computing device 200 shown in FIG. 2 may include a number of communication buses between each of the sensors and processors. For example, the co-processor 230 may communicate with each of the IMU 202, the GS camera 208, and the RS camera 212 over an inter-integrated circuit (I2C) bus that includes a multi-master serial single-ended bus for communication. The co-processor 230 may receive raw data collected, measured, or detected by each of the IMU 202, the GS camera 208, and the RS camera 212 over the same I2C bus or a separate communication bus. The co-processor 230 may communicate with the application processor 232 over a number of communication buses including a serial peripheral interface (SPI) bus that includes a synchronous serial data link that may operate in full duplex mode, the I2C bus, and a mobile industry processor interface (MIPI) that includes a serial interface configured for communicating camera or pixel information. Use of various buses may be determined based on need of speed of communication of data as well as bandwidth provided by the respective communication bus, for example.

Figure 4:
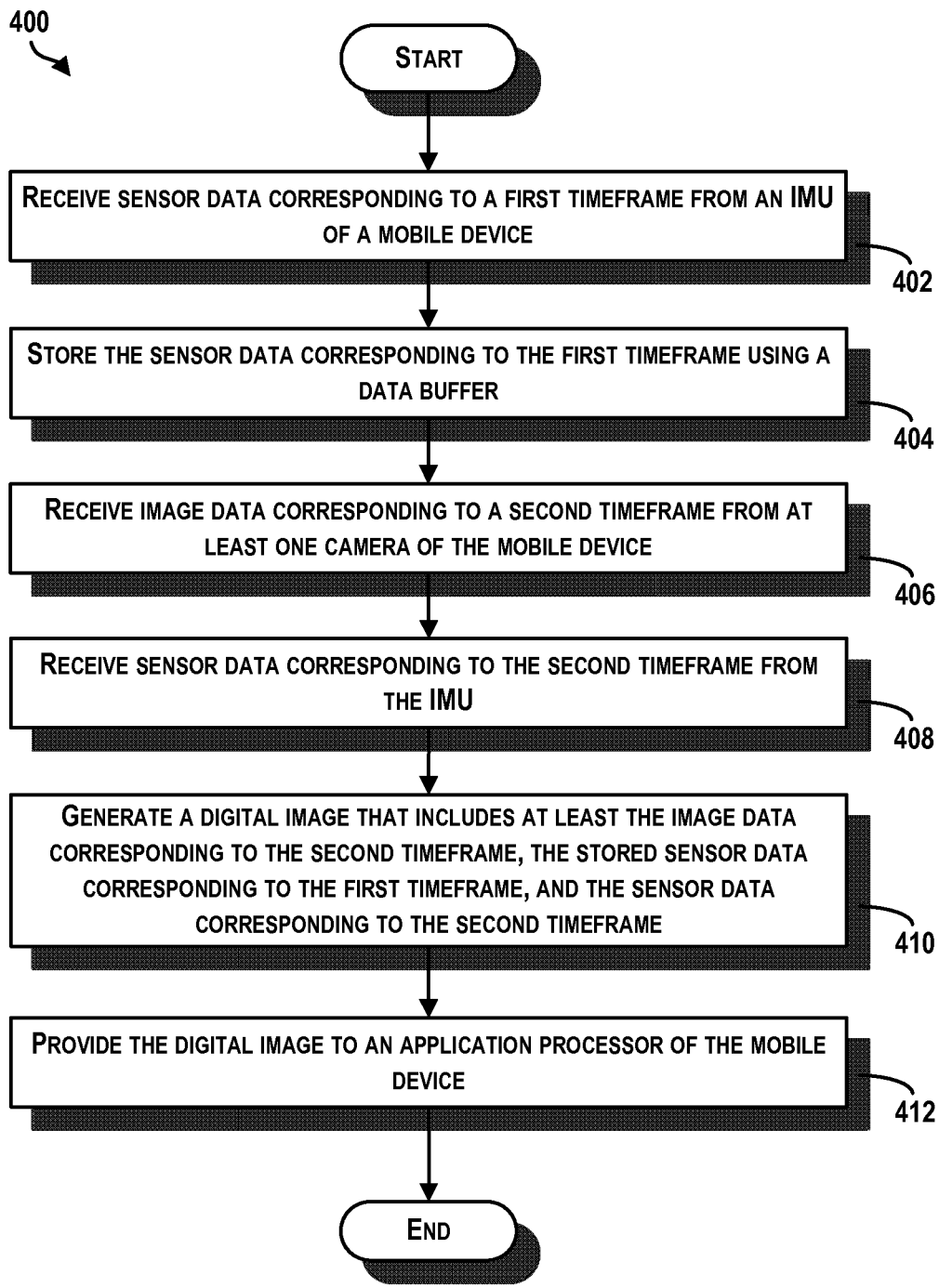
FIG. 4 is a block diagram of an example method for communicating sensor data.

FIG. 4 is next a block diagram of an example method 400 for communicating sensor data. Method 400 shown in FIG. 4 presents an embodiment of a method that could be used or implemented by the computing device 100 of FIG. 1 or the computing device 200 of FIG. 2, for example, or more generally by one or more components of any computing device. Method 400 may include one or more operations, functions, or actions as illustrated by one or more of blocks 402-412. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and random access memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 400 and other processes and methods disclosed herein, each block in FIG. 4 may represent circuitry that is wired to perform the specific logical functions in the process.

In one embodiment, functions of the method 400 may performed by a co-processor of a mobile device, such as the co-processor 230 of FIG. 2. In other embodiments, the functions of the method 400 may be distributed across multiple processors that are configured to acquire sensor data, generate a digital image, and/or generate a portion of the digital image, such as a particular segment of pixels of the digital image.

Initially, at block 402, the method 400 includes receiving sensor data corresponding to a first timeframe from an IMU of a mobile device. The sensor data may be received by a processor of the mobile device, such as the co-processor 230 of FIG. 2. In one example, the sensor data received from the IMU may include outputs related to velocity, orientation, and/or acceleration forces. For instance, the sensor data may include accelerometer values that are specified with respect to one or more axes, or angular velocity values that are specified with respect to one or more axes. The sensor data received from the IMU may take other forms as well.

Additionally, in some examples, the sensor data received from the IMU may include sensor data corresponding to one or more sub-frames within the first timeframe. If the IMU is configured to output sensor data at 100 or 120 Hz, for example, and the timeframe is 33 milliseconds long, the IMU may output data for multiple sub-frames within the 33 millisecond timeframe.

In one embodiment, the processor that receives the sensor data may be configured to determine timestamps associated with the sensor data. By way of example, the IMU may provide an interrupt to the processor, at which time the processor may generate a timestamp. The processor may then request the data from the IMU corresponding to the interrupt, and subsequently receive the data from the IMU. In other examples, the processor may not need to request the data from the IMU as the IMU will provide the data after providing an interrupt. Upon receipt of the sensor data, the processor may associate the timestamp with the respective data by matching interrupt timestamps to corresponding sensor data. Thus, the processor may be configured to determine timestamps associated with each sub-frame.

At block 404, the method 400 includes storing the sensor data corresponding to the first timeframe using a data buffer. For example, the processor may store the sensor data in a physical memory storage used to temporarily store data. In one embodiment, the processor may be configured to store sensor data for a predetermined length of time, after which the sensor data may be erased or written-over. For instance, the processor may be configured to store the sensor data corresponding to 3, 5, 10, or another number of recent timeframes.

At block 406, the method 400 includes receiving image data corresponding to a second timeframe from at least one camera of the mobile device. The image data may include one or more images received from one or more of the global shutter camera 208, rolling shutter camera 210, camera 212, and/or depth processor 228. Thus, in some examples, the image data from the at least one camera may include first image data from a first camera and second image data from a second camera. Furthermore, the image data may include one or any combination of two-dimensional images and three-dimensional (e.g., depth) images.

Additionally, the second timeframe may be subsequent to the first timeframe. For example, the second timeframe may be the timeframe immediately following the first timeframe. In an example in which the first timeframe is 33 milliseconds, the second timeframe may be the next 33 milliseconds. Thus, the first timeframe and the second timeframe may each be time intervals of the same duration.

At block 408, the method 400 includes receiving sensor data corresponding to the second timeframe from the IMU. As described with respect to block 402, the sensor data may include outputs related to velocity, orientation, and/or acceleration forces. Furthermore, the outputs may include outputs corresponding to multiple sub-frames respectively within the second timeframe.

At block 410, the method 400 includes generating a digital image that includes at least the image data corresponding to the second timeframe, the stored sensor data corresponding to the first timeframe, and the sensor data corresponding to the second timeframe. For example, a file may be generated in a digital image format that includes both the image data corresponding to the second timeframe and the sensor data corresponding to the first timeframe and the second timeframe. The image data may already be in pixel format, therefore the image data may be included in the digital image in a straightforward manner. Optionally, the image data may be converted from a first image format to a second image format in which the digital image is generated.

The sensor data may be included within the digital image by embedding the sensor data in multiple pixels of the digital image. For instance, the co-processor may be configured to represent the sensor data as fake pixels in the digital image (i.e., pixels whose values have been defined by a processor to represent a portion of a sensor value).

By way of example, the digital image may include pixels that are defined in a brightness and chrominance (YUV) color space. A 16-bit raw sensor value can then be embedded in a "Y" space of two pixels. For instance, eight bits of the 16-bit raw sensor value can be represented in a "Y" space of a first pixel and the remaining eight bits can be embedded in a "Y" space of a second pixel. Values in the "U" space and the "V" space of the pixels can be set to zero in order to ensure that the sensor value is not skewed during image compression or packing, for example.

As another example, a 32-bit single-precision floating point number can be represented in the "Y" space of four separate 8-bit pixels, while values in the "U" space and the "Y" space can be set to zero. Other examples are also possible depending on the number of bytes per pixel and/or color space utilized by the digital image. For instance, the sensor data may be embedded in the "U" space or "V" space instead of the "Y" space.

If the sensor data provided from the IMU or the image data received from the at least one camera includes timestamps, the timestamps may be embedded within pixels of the digital image as well. Alternatively, the processor may be configured to determine timestamps associated with the sensor data or the image data, and then embed the determined timestamps within the digital image.

In some embodiments, the processor may also be configured to generate computer-vision data using the image data received from the at least one camera of the mobile device. The computer-vision data may identify locations and/or descriptions of image features determined using a two-dimensional image and/or image features determined using depth data. Example types of image features include edges, corners/interest points, and blobs. An edge is a point in an image where there is a boundary between two image regions. Corners, or more generally interest points, refer to point-like features in an image which have a local two-dimensional structure. Algorithms such as the Harris & Stephens algorithm can be used to detect edges and corners. The Features from Accelerated Segment Test (FAST) algorithm is another example of an algorithm that may be used to detect corners and interest points. Finally, blobs describe regions of interest in an image (e.g., regions that are too smooth to be detected by a corner detector). The FAST algorithm, among others, can also be used to detect blobs.

The computer-vision data may then also be embedded in pixels of the digital image, in a similar manner to the sensor data. Furthermore, in some examples, the processor may be configured to retrieve stored computer-vision data corresponding to one or more previous timeframes from a data buffer, and embed the stored computer-vision data in the digital image.

And at block 412, the method 400 includes providing the digital image to an application processor of the mobile device. For instance, the digital image may be provided by the processor and to the application processor using a camera bus interface, such as a MIPI. In some examples, the digital image may be generated at 30 Hz, such that a new digital image with new image data and/or sensor data is provided to the application processor every 33 milliseconds.

Although method 400 is described with respect to IMU sensor data, in other examples, the method 400 may be performed using sensor data from any of the sensors as described above in any of FIG. 1, FIG. 2, or FIGS. 3A-3B, such as an accelerometer, a gyroscope, a barometer, a magnetometer, and a temperature sensor. It is contemplated that the sensors may include other types of sensors as well.

In one embodiment, the method 400 may further include providing the sensor data corresponding to the first timeframe and/or the second timeframe to the application processor using a separate channel. For instance, the sensor data corresponding to the first timeframe and/or the second timeframe may be provided by the processor to the application processor using a low-latency side channel. In some examples, the application processor may receive the sensor data provided using the low-latency side channel before receiving the digital image.

In line with the discussion above, the sensor data corresponding to the first timeframe may be redundant data received for error correction, since the sensor data corresponding to the first timeframe was likely received previously by the application processor. For instance, if the sensor data corresponding to the first timeframe was not received by the application processor with a previous digital image or was corrupted during data transmission, the redundant sensor data can be used to fill in missing data. As an example, if the computing device were rotating 30 degrees per second and a digital frame corresponding to the first timeframe was dropped, the computing device may not be able to determine an exact location and orientation of the computing device during the first timeframe (e.g., a location/orientation estimation of the computing device may now be a few degrees off from where the computing device is actually located). By providing redundant data in the second digital image, lost or missing sensor data corresponding to the first timeframe can be identified to make corrections to any location/orientation estimates.

Figure 5:
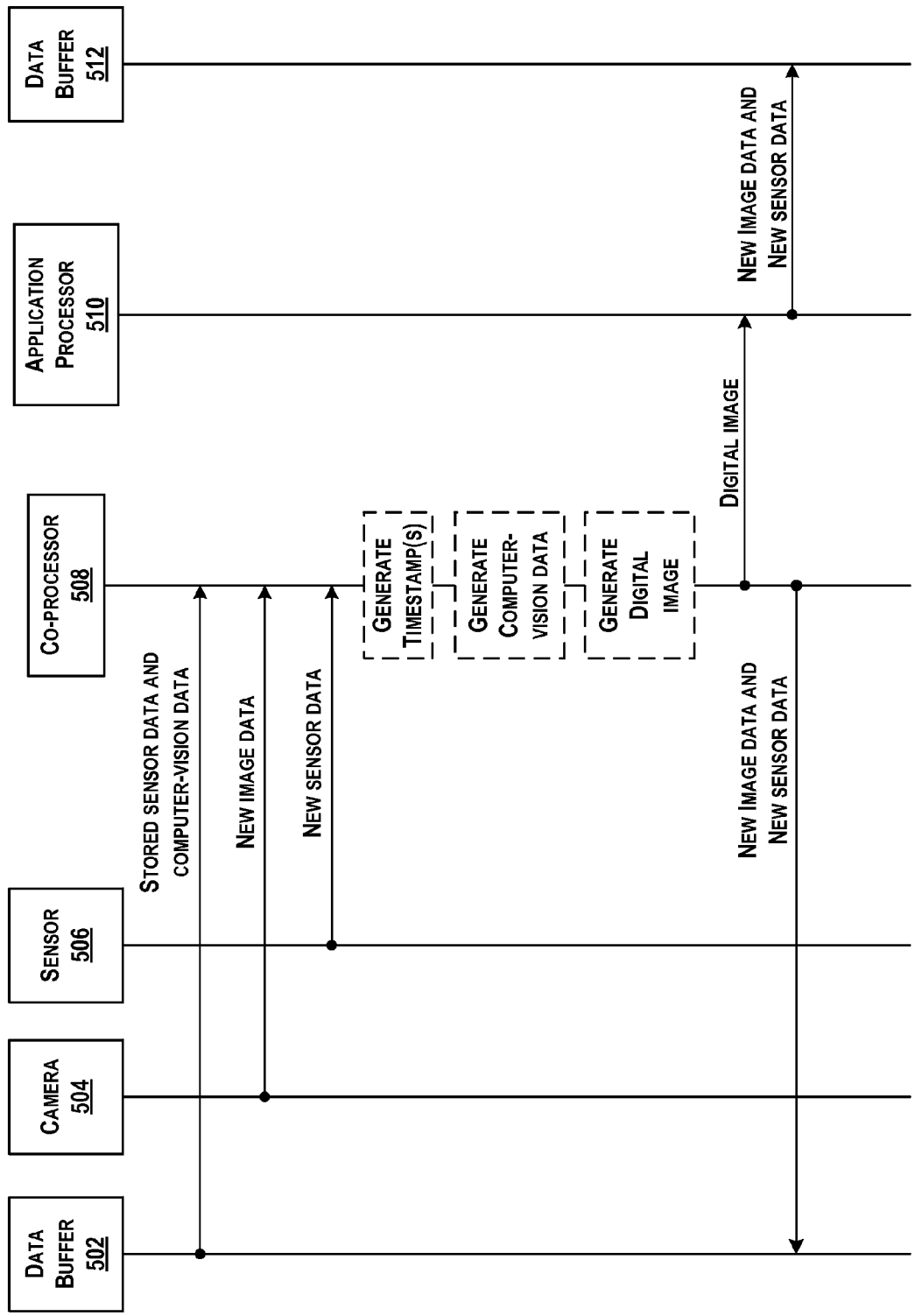
FIG. 5 is an example timing diagram conceptually illustrating communicating sensor data.

Referring now to FIG. 5, an example timing diagram conceptually illustrating communicating sensor data is shown. By way of example, FIG. 5 illustrates an example interaction between a data buffer 502, camera 504, sensor 506, co-processor 508, application processor 510, and data buffer 512.

As shown, the co-processor 508 may access sensor data and computer-vision data corresponding to one or more previous timeframes that is stored within the data buffer 502. The co-processor 508 may also receive new image data corresponding to a current timeframe, and new sensor data corresponding to the current timeframe. Further, the co-processor 508 may generate timestamps indicating when the new image data and/or new sensor data was acquired or received by the co-processor. Additionally, the co-processor 508 may generate computer-vision data using the new image data. And the co-processor 508 may generate a digital image that includes the stored sensor data and computer-vision data, the new image data, the new sensor data, and the determine timestamps. Finally, the co-processor 508 may provide the digital image to the application processor 510, and store the new image data and sensor data using the data buffer 502.

Furthermore, as shown, the application processor 510 may receive the digital image from the co-processor 508. The application processor 510 may also store the new image data and the new sensor data using the data buffer 512. In some examples, the application processor 510 may use the data buffer 512 to store image data and sensor data for a predetermined length of time (e.g., one second, several seconds, or longer durations). Thus, the data buffer 512 may include a running timeline of image data and sensor data that the application processor may utilize to perform one or more functions, such as odometry determination, map generation, etc.

Additionally, in some examples, the application processor 510 may determine whether the sensor data or computer-vision data corresponding to a previous time interval is already stored in the data buffer 512. In response to determining that the sensor data or computer-vision data is not stored in the data buffer 512 (e.g., because the sensor data or computer-vision data was not received for a previous digital image), the application processor 510 may then store the sensor data or the computer-vision data corresponding to the previous timeframe using the data buffer 512, in order to fill in the missing data.

Figure 6:
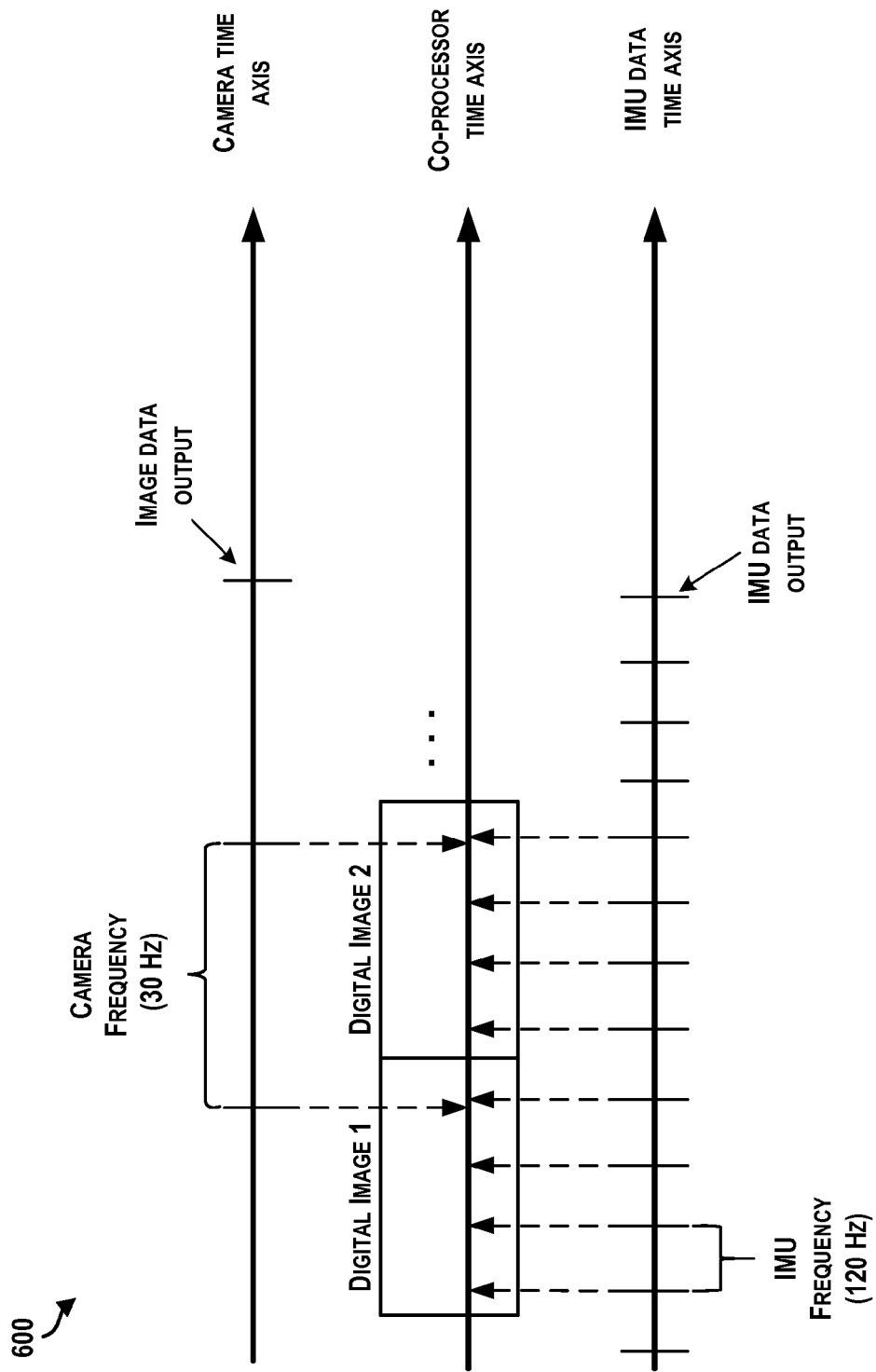
FIG. 6 is an example diagram conceptually illustrating generating a digital image.

FIG. 6 is an example diagram 600 conceptually illustrating generating a digital image. As shown in the diagram 600, a camera of the mobile device may output image data at a first frequency of 30 Hz, and an IMU may output data at a second frequency of 120 Hz. Furthermore, a co-processor may generate digital images at a third frequency. In the example diagram of 600, the third frequency is the same frequency as the first frequency of the camera, 30 Hz. In other examples, the third frequency may be a multiple of the first frequency, or the first frequency may be a multiple of the third frequency.

The co-processor may be configured to generate a first digital image during a first timeframe. As depicted in the example diagram 600, the first digital image includes a single output of image data (e.g., a single image), and multiple outputs of sensor data provided by the IMU. Similarly, the second digital image includes second image data output by the camera during a second subsequent timeframe and multiple additional outputs of sensor data received during the second timeframe.

The sensor data output by the IMU may thus be time-aligned with the image data output by the camera. The table below shows a sample set of images and sensor data that may be packed into a digital image together according to an example embodiment.

| Digital Image 1 | Digital Image 2 | Digital Image 3 |
|---|---|---|
| Begin: ts 0 ms | Begin: ts 33 ms | Begin: ts 66 ms |
| IMU pkt 1: ts 3 ms | IMU pkt 5: ts 35 ms | IMU pkt 9: ts 67 ms |
| IMU pkt 2: ts 11 ms | IMU pkt 6: ts 43 ms | IMU pkt 10: ts 75 ms |
| IMU pkt 3: ts 19 ms | IMU pkt 7: ts 51 ms | IMU pkt 11: ts 83 ms |
| IMU pkt 4: ts 27 ms | IMU pkt 8: ts 59 ms | IMU pkt 12: ts 91 ms |
| Image 1: ts 30 ms | Image 2: ts 63 ms | Image 3: ts 96 ms |

For instance, the table illustrates sample image data received at 30 Hz (approximated as once every 33 ms in the table and IMU packets received at 120 Hz (approximated as once every 8 ms in the table). In some embodiments, the first digital image and the second digital image may include additional types of data as well. FIG. 7 is a conceptual illustration of an example digital image format. The conceptual illustration 700 is shown for purposes of example only, and is not meant to be limiting in any manner. Other configurations and formats for the digital image are also contemplated.

As shown in FIG. 7, the example digital image format includes sensor data 702, computer-vision data 704, first camera data 706, depth data 708, and second camera data 710. The sensor data 702 is shown within the first sixteen rows of a digital image. Thereafter, in the next few rows, the computer-vision data 704 is provided. Consequently, in an example in which the digital image is provided to the application processor row by row, the sensor data 702 would first be provided, followed by the computer-vision data 704.

Below the sensor data 702 and computer-vision data 704, which are shown as occupying 31 rows in the example digital image format 700, larger data sources are provided. The larger data sources include the first camera data 706, followed by the depth data 708, and the second camera data 710. In one example, the first camera data 706 may be an image from a first camera having a field of view that is greater than 120 degrees, such as the GS camera 208 of FIG. 2. Further, the second camera data may be an image from a second camera having a smaller field of view, such as the RS camera 210 of FIG. 2.

Note that the example digital image format shown in FIG. 7 is just one example. In other instances, other digital image formats may be utilized. For instance, the first camera data 706 and the second camera data 710 may be located side-by-side within rows 31-510 of a digital image (not shown). Similarly, in other example digital image formats, more or less data may be provided. For instance, in another digital image format the depth data or the computer-vision data may be omitted, or third camera data from a third camera may also be included. As another example, in another digital image format, a combined color and depth image may be provided in addition to or in place of the first camera data 706, the depth data 708, and/or second camera data 710.

In another example digital image format, the digital image may include padding between one or more of the different data segments. For example, the digital image may be padded with blank or empty data in between the first camera data 706 and the depth data 708 or between the depth data 708 and the second camera data 710. In some instances, the padding between the different data segments may be inserted in order to make sure that the beginning of each data segment corresponds to the beginning of a sector or subdivision of a track in a memory.

As an example, padding may be inserted between data segments to make sure that the beginning of the first camera data 706 corresponds to the beginning of a 4096-byte (4K) sector. This may allow the first camera data 706 to be written more efficiently to memory. Similarly, the digital image may be padded such that the beginning of each of the depth data 708 and second camera data 710 corresponds to the beginning of a 4K sector.

In another example digital image format, the width of the digital image may be 1280 pixels. As a result, each row of the digital image may include two rows of pixel data from the first camera data. The rows may be organized side-by-side. For example, columns 0-639 of row 31 of the digital image may include a first row of pixels of the first camera data 706 and columns 640-1279 of row 31 may include a second row of pixels of the first camera data 706. Similarly, a single row of the digital image may include two rows of depth data 708 or two rows of pixels of second camera data 710.

Figure 8:
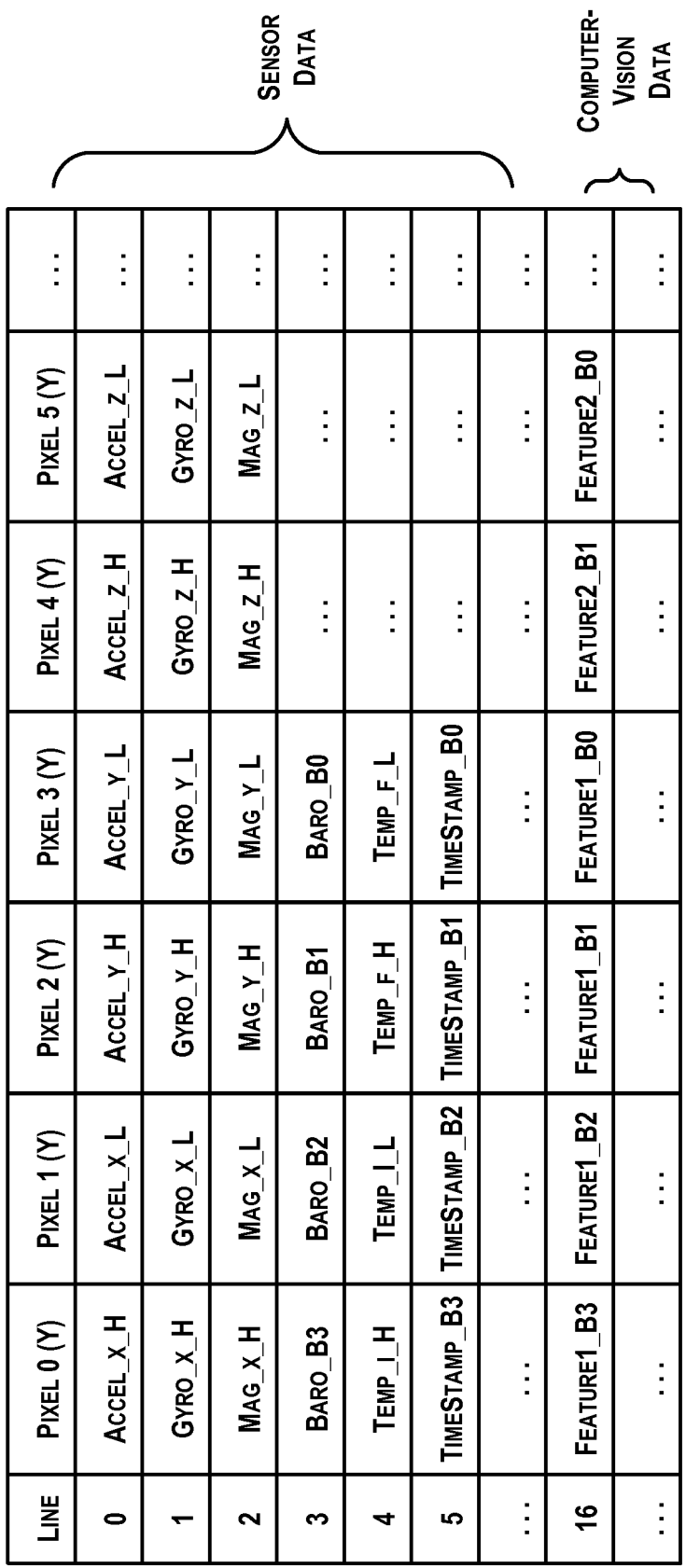
FIG. 8 is a conceptual illustration of example sensor data and computer-vision data formats.

In FIG. 8, a conceptual illustration 800 of example sensor data and computer-vision data formats is provided. As shown in FIG. 8, accelerometer data is provided in a first line (e.g., a first row of pixels) of a digital image. In particular, the eight highest bits of a 16-bit x-axis acceleration value (i.e., a high byte) are shown within the "Y" space of a first pixel while the eight lowest bits of the 16-bit x-axis acceleration value (i.e., a low byte) are shown within the "Y" space of a second pixel. Similarly, y-axis acceleration values and z-axis acceleration values are shown in the "Y" space of pixels 2-3 and 4-5 respectively. Furthermore, gyroscope data and magnetometer data are also embedded within the "Y" space of pixels 0-5 of lines 1 and 2.

The barometer reading is shown as four separate bytes (B3, B2, B1, and B0) that, when combined, represent a 32-bit number. In line 4, an integer component of a temperature reading is shown in the "Y" space of pixels 0-1, while a fraction component of the temperature reading is shown in the "Y" space of pixels 2-3. Additionally, a timestamp that has been divided into four eight bit values is also shown in line 5. In other examples, the sensor data may also include timestamp data for one or more of the other sensors.

Although sensor data for each type of sensor is located within an individual row of pixels in FIG. 8, in other examples, the sensor data may be represented within a single row of pixels (not shown). For example, the gyroscope data may be embedded in the "Y" space of pixels 6-11, the magnetometer data may be represented in the "Y" space of pixels 12-17, and so forth.

FIG. 8 also illustrates example formats of computer-vision data. For example, a first four-byte image feature is embedded in the "Y" space of the first four pixels of line 16. Additionally, a second, two-byte, image feature is embedded in the "Y" space of pixels 4-5. Other configurations are also contemplated.

Figure 9:
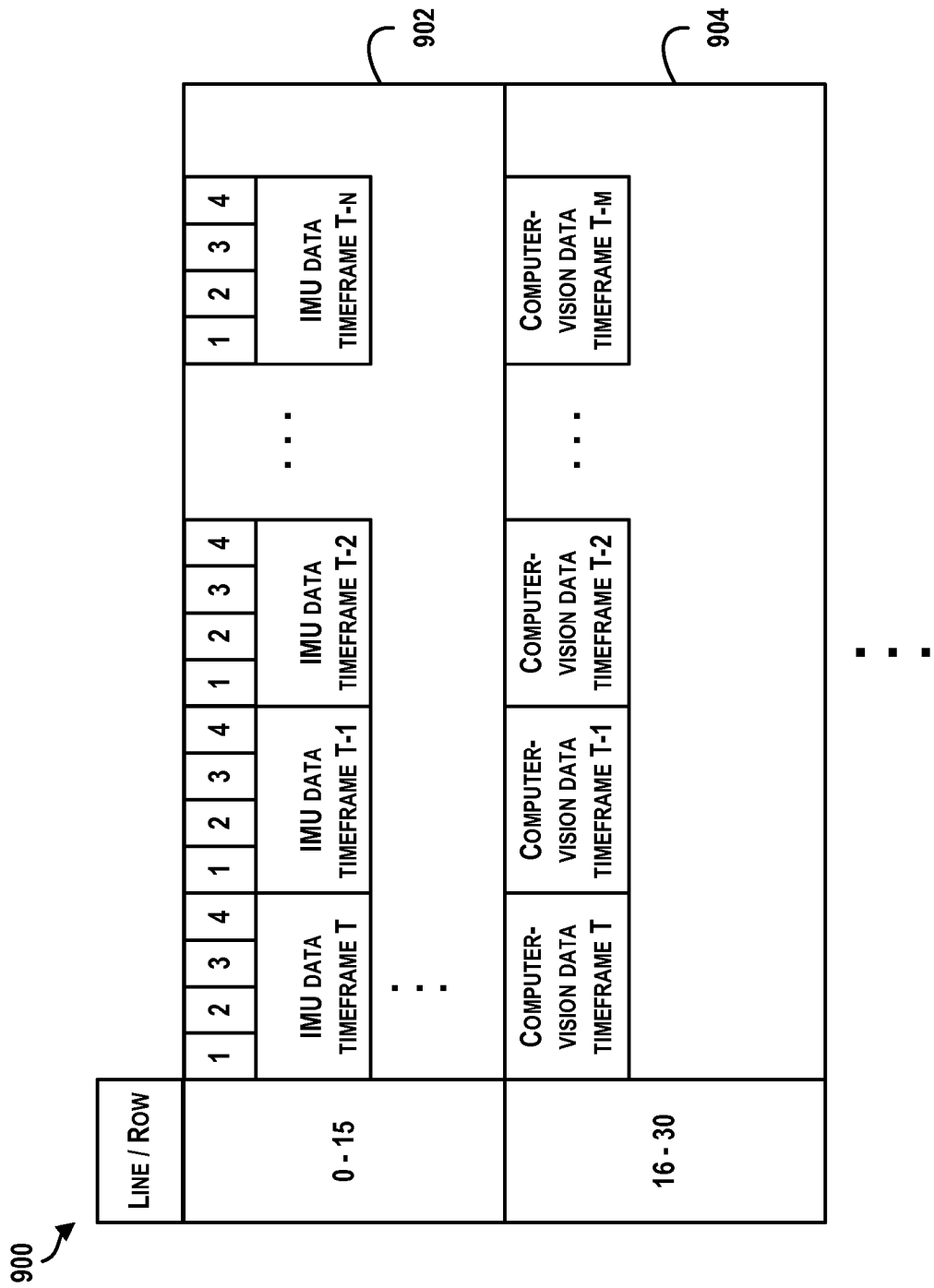
FIG. 9 is another conceptual illustration of an example digital image format.

As discussed above, according to the present disclosure, a digital image may also include redundant sensor data and/or computer-vision data, such as sensor data or computer-vision data corresponding to one or more previous timeframes. FIG. 9 is another conceptual illustration of an example digital image format 900. The example digital image format 900 includes sensor data 902 and computer-vision data 904, which may each be embedded in pixels of the digital image. The example digital format 900 may include other types of data as well (not shown).

As shown in FIG. 9, the sensor data 902 includes IMU data for a current timeframe "T" as well as a number "n" previous timeframes. Furthermore, the IMU data corresponding to each respective timeframe includes IMU data corresponding to four sub-frames within the timeframe. Similarly, the computer-vision data 904 includes computer-vision data for the current timeframe "T" as well as a number "m" previous timeframes. The computer-vision data for a given timeframe may include computer-vision data determined using a single image received from a single camera of the mobile device during the timeframe, or the computer-vision data may include computer-vision data determined using images received from multiple cameras during the timeframe. Depending on the desired configuration, the number "n" may be greater than, less than, or equal to the number "m".

Figure 10:
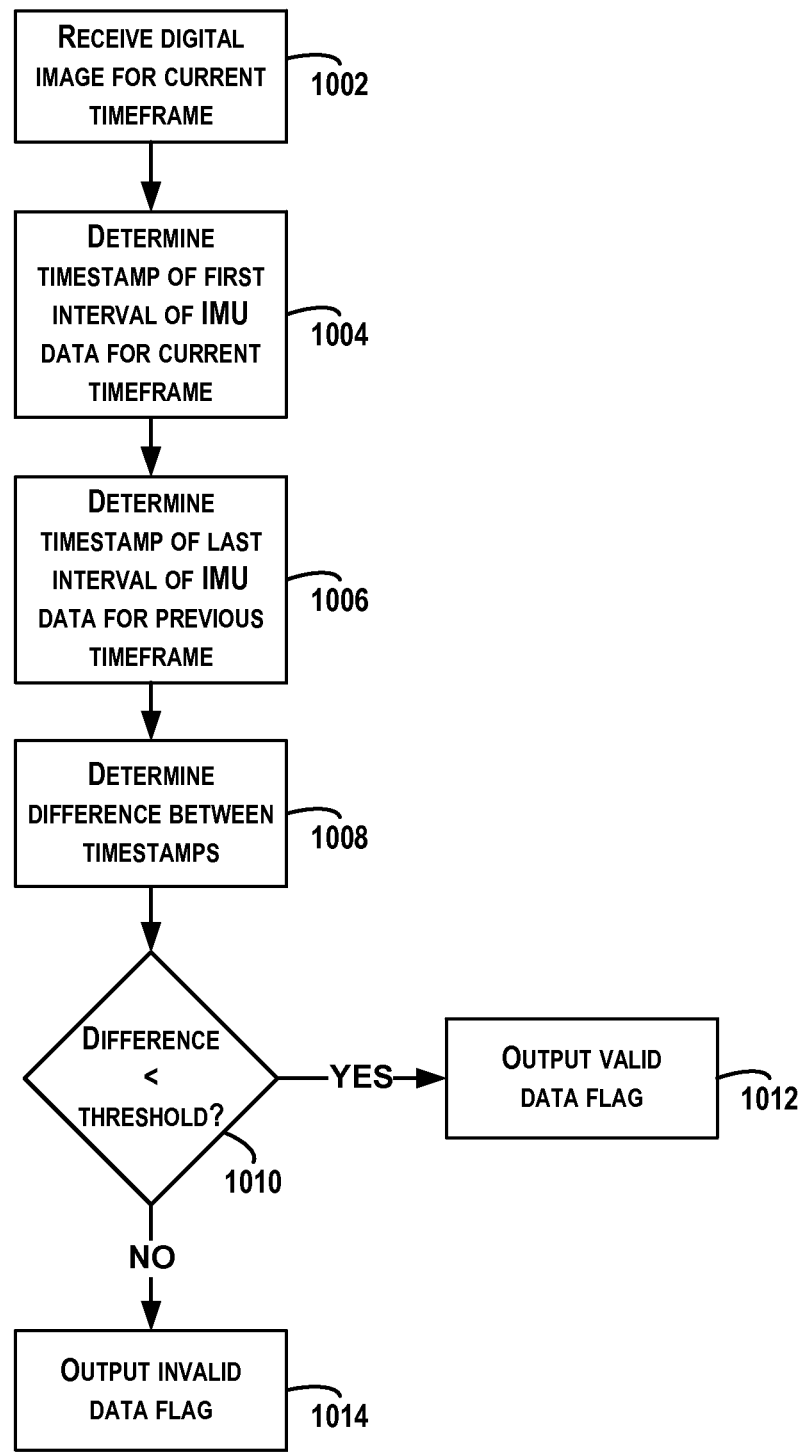
FIG. 10 is a block diagram of example additional or optional functions that may be performed to validate a digital image.

In some embodiments, the application processor that receives a digital image may use the redundant sensor data included within the digital image to test the validity of the digital image. FIG. 10 is a block diagram of additional or optional functions that may be performed to validate a digital image. In one embodiment, the functions may be performed by an application processor of a mobile device, such as the application processor 232 of FIG. 2. In other embodiments, the functions may be distributed across multiple processors of a mobile device, or performed by one or more processors in a server.

The function at block 1002 involves receiving a digital image for a current timeframe. In some examples, the digital image may include IMU data for a current timeframe as well as at least one previous timeframe. Additionally, the IMU data for the current timeframe and optionally the at least one previous timeframe may include multiple outputs of IMU data corresponding to sub-frames within the current timeframe and the at least one previous timeframe respectively.

The function at block 1004 then involves determining a timestamp of a first interval of IMU data for the current timeframe. For instance, the IMU data for the current timeframe may include four packets of IMU data, and the earliest or first interval of IMU data may include an associated timestamp of 45 milliseconds.

The function at block 1006 involves determining a timestamp of a last interval of IMU data for the previous timeframe. If the digital image includes IMU data for the previous timeframe, the application processor may identify a last interval of IMU data for the previous timeframe, and determine a timestamp of the last interval. For example, the timestamp may be 37 milliseconds. Alternatively, the application processor may determine the timestamp of the last interval of IMU data for the previous timeframe based on data stored in a data buffer. For instance, the application processor may store a buffer of sensor data in the data buffer, and the application processor may access the data buffer to determine the timestamp associated with the last interval of IMU data for the previous timeframe.

Further, the function at block 1008 involves determining a difference between the timestamps. Continuing with the examples above, the timestamp associated with the last interval of IMU data may be 35 ms and the timestamp associated with the first interval of IMU data may be 45 ms, such that the application processor may determine a difference of 8 ms.

The function at block 1010 then involves comparing the difference to a threshold. The threshold may be determined based on a frequency with which the IMU is configured to output sensor data and a desired tolerance. For example, if the IMU outputs data at 120 Hz, which corresponds to about every 8 milliseconds, and tolerance is two milliseconds, the threshold may be 10 milliseconds.

Accordingly, if it is determined at block 1010 that the difference is less than the threshold, at block 1012, the application processor may provide an output indicating that the IMU data of the current digital image is valid. On the other hand, if it is determined at block 1010 that the difference is not less than the threshold, at block 1014, the application processor may provide an output indicating that the IMU data of the current digital image is invalid.

The functions described with respect to FIG. 10 may also be applicable to testing data received from other types of sensors, such as image data received from a camera of the mobile device or sensor data received from any of the sensors as described above in any of FIG. 1, FIG. 2, or FIGS. 3A-3B, such as an accelerometer, a gyroscope, a barometer, a magnetometer, and a temperature sensor. Therefore, the example is not meant to be limiting.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, by a processor of a mobile device and from an inertial measurement unit (IMU) of the mobile device, sensor data corresponding to a first timeframe;
storing, by the processor, the sensor data corresponding to the first timeframe using a data buffer;
receiving, by the processor and from at least one camera of the mobile device, image data corresponding to a second timeframe, wherein the second timeframe is subsequent to the first timeframe;
receiving, by the processor and from the IMU, sensor data corresponding to the second timeframe;
generating, by the processor, a digital image that includes at least the image data corresponding to the second timeframe, the stored sensor data corresponding to the first timeframe, and the sensor data corresponding to the second timeframe, wherein the stored sensor data corresponding to the first timeframe and the sensor data corresponding to the second timeframe are embedded in pixels of the digital image; and
providing, by the processor, the digital image to an application processor of the mobile device.

2. The method of claim 1, further comprising storing the sensor data corresponding to the second timeframe using the data buffer.

3. The method of claim 2, further comprising:
receiving, by the processor and from the IMU, sensor data corresponding to a third timeframe, wherein the third timeframe is subsequent to the second timeframe;
receiving, by the processor and from at least one camera of the mobile device, image data corresponding to the third timeframe;
generating, by the processor, another digital image that includes at least the image data corresponding to the third timeframe, the stored sensor data corresponding to the first timeframe, the stored sensor data corresponding to the second timeframe, and the sensor data corresponding to the third timeframe, wherein the stored sensor data corresponding to the first timeframe, the stored sensor data corresponding to the second timeframe, and the sensor data corresponding to the third timeframe are embedded in pixels of the digital image; and
providing, by the processor, the other digital image to the application processor.

4. The method of claim 1, further comprising determining time stamps associated with the first timeframe and the second timeframe respectively,
wherein the digital image further includes the determined time stamps, and
wherein the determined time stamps are embedded in additional pixels of the digital image.

5. The method of claim 4:
wherein the sensor data corresponding to the first timeframe includes sensor data corresponding to two or more sub-timeframes within the first timeframe, and
wherein determining a time stamp associated with the first timeframe comprises determining time stamps associated with the sub-timeframes.

6. The method of claim 1:
wherein the IMU outputs sensor data in intervals, and
wherein the sensor data corresponding to the second timeframe comprises sensor data from a present interval as well as sensor data form one or more previous intervals.

7. The method of claim 1, wherein the image data from the at least one camera comprises first image data from a first camera and second image data from a second camera, the second camera having a field of view that is greater than 120 degrees.

8. The method of claim 1, further comprising receiving, by the processor and from a depth processor of the mobile device, depth data corresponding to the second timeframe, wherein the digital image further comprises the depth data.

9. The method of claim 1, further comprising:
determining computer-vision data using the image data corresponding to the first timeframe, wherein the computer-vision data comprises one or more image features of an image;
storing the computer-vision data corresponding to the first timeframe using the data buffer; and
determining computer-vision data using the image data corresponding to the second timeframe, wherein the digital image further comprises the stored computer-vision data corresponding to the first timeframe and the computer-vision data corresponding to the second timeframe.

10. The method of claim 1, wherein the first timeframe and the second timeframe are each less than 50 milliseconds in duration.

11. The method of claim 1, wherein the processor is configured to provide digital images to the application processor in intervals, and wherein the first timeframe corresponds to an interval immediately preceding the second timeframe.

12. The method of claim 1, further comprising providing the digital image to the application processor using a camera bus interface.

13. A processing unit in a mobile device, the processing unit comprising:
- data storage; and
- instructions stored in the data storage and executable by the processing unit to perform functions comprising:
  - receiving from an inertial measurement unit (IMU) of the mobile device sensor data corresponding to a first timeframe,
  - receiving from at least one camera of the mobile device image data corresponding to the first timeframe,
  - accessing stored sensor data corresponding to a second timeframe, wherein the second timeframe precedes the first timeframe,
  - generating a digital image that includes at least the image data corresponding to the first timeframe, the stored sensor data corresponding to the second timeframe, and the sensor data corresponding to the first timeframe, wherein the stored sensor data corresponding to the second timeframe and the sensor data corresponding to the first timeframe are embedded in pixels of the digital image, and
  - providing the digital image to an application processor of the mobile device.

14. The processing unit of claim 13, wherein the stored sensor data corresponding to the second timeframe is stored in a data buffer of the mobile device.

15. The processing unit of claim 14:
- wherein the functions further comprise accessing stored computer-vision data corresponding to the second timeframe, and
- wherein the digital image further comprises the stored computer-vision data.

16. The processing unit of claim 13:
- wherein the functions further comprise determining time stamps associated with the first timeframe and the second timeframe respectively,
- wherein the digital image further includes the determined time stamps, and
- wherein the determined time stamps are embedded in additional pixels of the digital image.

17. A mobile device, comprising:
- at least one camera;
- an inertial measurement unit (IMU);
- a first data buffer;
- a second data buffer;
- a processor, the processor configured to:
  - receive from the IMU sensor data corresponding to a first timeframe,
  - receive from the at least one camera image data corresponding to the first timeframe,
  - access, from the first data buffer, stored sensor data corresponding to a second timeframe, wherein the second timeframe precedes the first timeframe, and
  - generate a digital image that includes at least the image data corresponding to the first timeframe, the stored sensor data corresponding to the second timeframe, and the sensor data corresponding to the first timeframe, wherein the stored sensor data corresponding to the second timeframe and the sensor data corresponding to the first timeframe are embedded in pixels of the digital image; and
- an application processor, the application processor configured to:
  - receive the digital image from the processor, and
  - store the image data corresponding to the first timeframe and the sensor data corresponding to the first timeframe in the second data buffer.

18. The mobile device of claim 17, wherein the application processor is further configured to:
- determine whether the sensor data corresponding to the second timeframe is stored in the second data buffer; and
- in response to determining that the sensor data corresponding to the second timeframe is not stored in the second data buffer, store the sensor data corresponding to the second timeframe in the second data buffer.

19. The mobile device of claim 17:
- wherein the stored sensor data corresponding to the second timeframe includes time stamps associated with the stored sensor data,
- wherein the processor is further configured to determine time stamps associated with the sensor data corresponding to the first timeframe, and
- wherein the digital image further includes the time stamps associated with the stored sensor data corresponding to the second timeframe and the time stamps associated with the sensor data corresponding to the first timeframe.

20. The mobile device of claim 19, wherein the application processor is further configured to determine a validity of the sensor data corresponding to the first timeframe based on a time alignment between the time stamps associated with sensor data corresponding to the first timeframe and the time stamps associated with the sensor data corresponding to the second timeframe.

* * * * *